US010355255B2

(12) United States Patent
Seo et al.

(10) Patent No.: US 10,355,255 B2
(45) Date of Patent: Jul. 16, 2019

(54) BATTERY MODULE AND BATTERY PACK COMPRISING SAME

(71) Applicant: LG CHEM, LTD., Seoul (KR)

(72) Inventors: Jae-Hyun Seo, Daejeon (KR); Nam-In Kim, Daejeon (KR); Young-Sop Eom, Daejeon (KR); Bo-Hyon Kim, Daejeon (KR); Hyun-Young Cho, Daejeon (KR)

(73) Assignee: LG CHEM, LTD., Seoul (KR)

( * ) Notice: Subject to any disclaimer, the term of this patent is extended or adjusted under 35 U.S.C. 154(b) by 124 days.

(21) Appl. No.: 15/574,626

(22) PCT Filed: Sep. 8, 2016

(86) PCT No.: PCT/KR2016/010108
§ 371 (c)(1),
(2) Date: Nov. 16, 2017

(87) PCT Pub. No.: WO2017/061709
PCT Pub. Date: Apr. 13, 2017

(65) Prior Publication Data
US 2018/0138475 A1    May 17, 2018

(30) Foreign Application Priority Data

Oct. 5, 2015   (KR) .................. 10-2015-0139885

(51) Int. Cl.
*H01M 2/10* (2006.01)
*H01M 10/0525* (2010.01)

(52) U.S. Cl.
CPC ..... *H01M 2/1077* (2013.01); *H01M 10/0525* (2013.01); *H01M 2220/20* (2013.01)

(58) Field of Classification Search
CPC ...... H01M 2/024; H01M 2/04; H01M 2/0277; H01M 2/1077; H01M 10/425; H01M 2/10

See application file for complete search history.

(56) References Cited

U.S. PATENT DOCUMENTS

| 2010/0255363 A1 | 10/2010 | Yoon et al. |
| 2011/0287287 A1 | 11/2011 | Kang |

(Continued)

FOREIGN PATENT DOCUMENTS

| EP | 2 317 586 A1 | 5/2011 |
| EP | 2 403 032 A1 | 1/2012 |

(Continued)

OTHER PUBLICATIONS

International Search Report, issued in PCT/KR2016/010108, dated Dec. 20, 2016.

*Primary Examiner* — Stewart A Fraser
(74) *Attorney, Agent, or Firm* — Birch, Stewart, Kolasch & Birch, LLP

(57) ABSTRACT

Provided is a battery module. The battery module according to an embodiment of the present disclosure may include: a cartridge assembly including a plurality of cartridges receiving battery cells; a substrate protecting body combined to the cartridge assembly; a casing receiving the cartridge assembly and the substrate protecting body and surrounding the cartridge assembly and the substrate protecting body; and a cover combined to the casing, wherein the substrate protecting body includes a interval retaining unit so that a main body of the substrate protecting body is separated from the casing at a predetermined interval.

10 Claims, 3 Drawing Sheets

(56) References Cited

U.S. PATENT DOCUMENTS

| | | | | |
|---|---|---|---|---|
| 2014/0017542 A1* | 1/2014 | Suzuki | ............... | B62M 6/90 |
| | | | | 429/99 |
| 2015/0024252 A1* | 1/2015 | Seong | ............ | H01M 2/0237 |
| | | | | 429/153 |
| 2016/0056425 A1* | 2/2016 | Kim | ............... | H01M 2/1061 |
| | | | | 429/151 |
| 2018/0166660 A1* | 6/2018 | Kim | ........... | H01M 2/10 |

FOREIGN PATENT DOCUMENTS

| | | |
|---|---|---|
| JP | 9-320551 A | 12/1997 |
| KR | 10-2007-0081584 A | 8/2007 |
| KR | 10-2010-0088030 A | 8/2010 |
| KR | 10-2012-0074421 A | 7/2012 |
| KR | 10-2015-0042463 A | 4/2015 |
| WO | WO 2014/185566 A1 | 11/2014 |

* cited by examiner

BATTERY MODULE AND BATTERY PACK COMPRISING SAME

TECHNICAL FIELD

The present disclosure relates to a battery module and a battery pack including the battery module, and more particularly, to a battery module in which components of a plastic material arranged inside the battery module are spaced apart from welded parts at predetermined intervals so that thermal deformation caused by heat generated during welding can be prevented, and a battery pack including the battery module.

The present application claims priority to Korean Patent Application No. 10-2015-0139885 filed on Oct. 5, 2015 in the Republic of Korea, the disclosure of which is incorporated herein by reference.

BACKGROUND ART

As technology development and demand for mobile devices have increased, demand for a secondary battery as an energy source has rapidly increased. Conventionally, a nickel-cadmium battery or a hydrogen ion battery has been used as the secondary battery. However, a lithium secondary battery is recently widely used because charging and discharging is free due to rare memory effect in comparison with a nickel-based secondary battery, a self-discharge rate is very low, and an energy density is high.

Such lithium secondary battery mainly uses a lithium oxide and a carbonaceous material as a positive electrode active material and a negative electrode active material, respectively. The lithium secondary battery includes an electrode assembly in which a positive electrode plate and a negative electrode plate, respectively coated with the positive electrode active material and the negative electrode active material, are arranged with a separator therebetween, and a packaging member, that is, a battery case, which seals and receives the electrode assembly together with an electrolyte solution.

The lithium secondary battery includes the positive electrode, the negative electrode, the separator therebetween, and an electrolyte. Depending on a type of the positive electrode active material and the negative electrode active material being used, the lithium secondary battery is divided into a lithium ion battery (LIB), a lithium polymer ion battery (LPIB), and etc. Typically, an electrode of the lithium secondary battery is formed by applying the positive electrode active material or the negative electrode active material to a current collector such as a sheet, a mesh, a film, and a foil of aluminum or copper and then drying the applied positive electrode active material or negative electrode active material.

Generally, a battery module of the secondary battery may be combined with a plate by using a welding method or the like in order to protect internal components from vibration or shock. In this case, it is a problem that injection-molded components of a plastic material arranged inside the battery module can be thermally deformed and damaged by heat generated during welding.

DISCLOSURE

Technical Problem

The present disclosure is designed to solve the problems of the related art, and therefore, the present disclosure is directed to providing a battery module, in which components of a plastic material arranged in a battery module are spaced apart from welded parts at predetermined intervals in order to prevent thermal deformation caused by heat generated during welding, and a battery pack including the battery module.

In addition, the present disclosure is directed to providing a battery module, in which thermal deformation of the plastic material may be prevented and costs needed for product replacement may be reduced, and a battery pack including the battery module.

Technical Solution

In one aspect of the present disclosure, there is provided a battery module including: a cartridge assembly including a plurality of cartridges receiving battery cells; a substrate protecting body combined to the cartridge assembly; a casing receiving the cartridge assembly and the substrate protecting body and surrounding the cartridge assembly and the substrate protecting body; and a cover combined to the casing, wherein the substrate protecting body includes an interval retaining unit so that a main body of the substrate protecting body is separated from the casing at a predetermined interval.

Further, the interval retaining unit may include at least one protrusion protruding from the main body and contacting the casing.

In addition, the casing may include a non-contacting unit which does not contact the interval retaining unit, and the non-contacting unit may be spaced apart from the main body at the predetermined interval.

Further, the non-contacting unit may include a welded part where welding is performed.

In addition, the casing may include: a first casing surrounding the cartridge assembly; and a second casing combined to the first casing and surrounding the substrate protecting body.

Further, the first casing and the second casing may be prepared in a separate form and combined to each other.

In addition, the first casing and the second casing may be combined to each other by a laser welding.

Further, the substrate protecting body may be formed of a plastic material.

According to another aspect of the present disclosure, there is provided a battery pack including the battery module described above and further, an automobile including the battery module may be provided.

Advantageous Effects

The present disclosure gives the following effects.

Thermal deformation caused by heat generated during welding may be prevented because components of a plastic material arranged in a battery module are spaced apart from welded parts at predetermined intervals.

In addition, since no thermal deformation occurs in the plastic material, costs needed for replacing the plastic material in which the thermal deformation has occurred may be reduced.

MODE FOR DISCLOSURE

Figure 1:
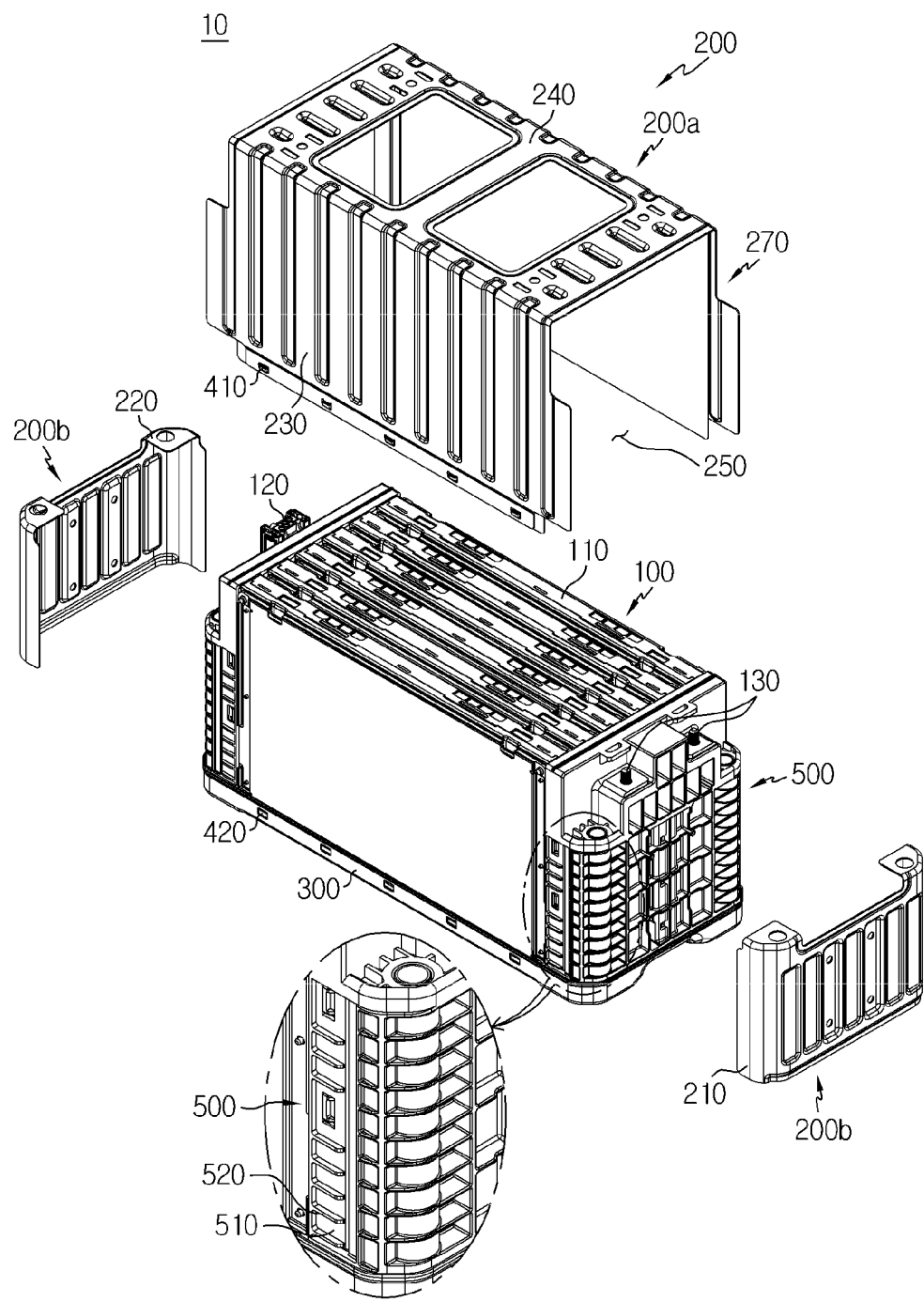
FIG. 1 is an exploded perspective view with a partially enlarged view illustrating a battery module according to an embodiment of the present disclosure.

Hereinafter, a battery module and a battery pack including the battery module according to embodiments of the present disclosure will be described in detail with reference to the accompanying drawings.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation. Therefore, the description proposed herein is just a preferable example for the purpose of illustrations only, not intended to limit the scope of the disclosure, so it should be understood that other equivalents and modifications could be made thereto without departing from the scope of the disclosure.

In the drawings, the size of each element or a specific part constituting the element is exaggerated, omitted, or schematically shown for convenience and clarity of description. Thus, the size of each component may not entirely reflect the actual size. In the case where it is judged that the detailed description of the related known functions or constructions may unnecessarily obscure the gist of the present disclosure, such explanation will be omitted.

The term, 'combine' or 'connect' as used herein, may refer not only to a case where one member and another member are directly combined or directly connected but also a case where one member is indirectly combined with another member via a connecting member or is indirectly connected.

Figure 2:
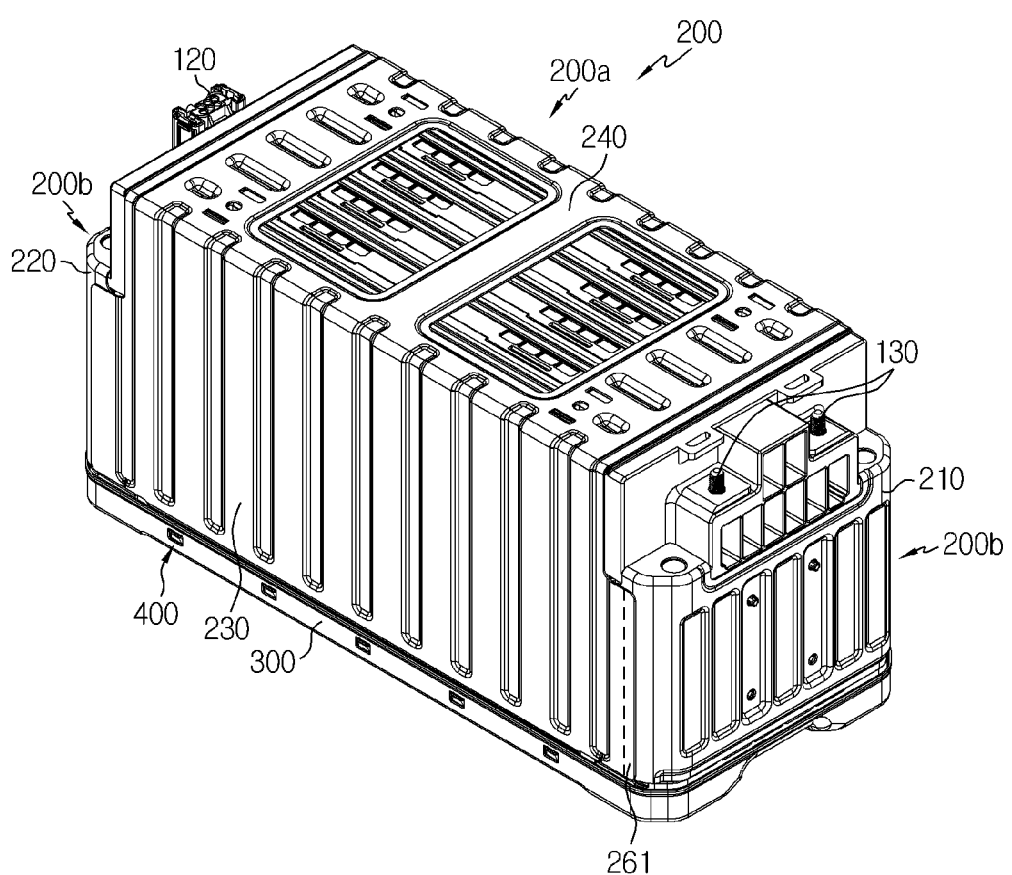
FIG. 2 is an assembled perspective view of FIG. 1.

FIG. 1 is an exploded perspective view with a partially enlarged view illustrating a battery module 10 according to an embodiment of the present disclosure, and FIG. 2 is an assembled perspective view of FIG. 1.

Referring to FIGS. 1 and 2, the battery module 10 according to an embodiment of the present disclosure may include a cartridge assembly 100, a casing 200, a cover 300, and a substrate protecting body 500.

Referring to FIG. 1, the cartridge assembly 100 may include a plurality of cartridges receiving the battery cells 110. The cartridge assembly 100 may be manufactured by an injection molding of plastic and the plurality of cartridges including receiving units receiving the battery cells 110 may be stacked. The cartridge assembly 100 may be accommodated inside a space formed by a combination of the casing 200 and the cover 300, and the battery cell 110 received in the cartridge may be accommodated inside the space and protected. The cartridge assembly 100 may include a connecting element 120 or a terminal element 130. The connecting element 120 may include various types of electrical connecting parts or connecting members for being connected to, for example, a battery management system (BMS) (not illustrated) capable of providing data on voltage or temperature of the battery cell 110, or the like. In addition, the terminal element 130, as a main terminal connected to the battery cell 110, may include a positive electrode terminal and a negative electrode terminal, and may be electrically connected to the outside through a terminal bolt.

Referring to FIGS. 1 and 2, the casing 200 may receive and surround the cartridge assembly 100 and the substrate protecting body 500 to be described later, thereby protecting the cartridge assembly 100 and the substrate protecting body 500 from external vibration or impact.

The casing 200 may include a first casing 200a and a second casing 200b. The first casing 200a may be formed to surround the cartridge assembly 100 and then to protect the cartridge assembly 100 from the external vibration or impact, and the second casing 200b may be formed to be combined to the first casing 200a, to surround the substrate protecting body 500, and then to protect the substrate protecting body 500 from the external vibration or impact. Here, the casing 200 may be formed by manufacturing the first casing 200a and the second casing 200b in a separate form, and combining the first casing 200a and the second casing 200b to each other by various methods such as welding. To explain this with an example, referring to FIG. 1, when the casing 200 is made of a plate of metal material, the casing 200 may include a front plate 210, a rear plate 220, a side plate 230, and a top plate 240. Here, the first casing 200a may include the side plate 230 and the top plate 240 which are formed as an integrated form, and the second casing 200b may include the front plate 210 or the rear plate 220, and the first casing 200a and the second casing 200b may be combined to each other by welding, particularly, by a laser welding or the like. However, a method of combining respective plates 210, 220, 230, and 240 may not be limited to the laser welding, and may include various methods of welding excluding the laser welding. In addition, it is not excluded that respective plates 210, 220, 230, 240 can be combined to each other by various methods such as a rivet, a bolt, a pin, a bracket, and a moment bonding method. Here, the substrate protecting body 500 of a plastic material may be located close to a welded part 261, where the first casing 200a and the second casing 200b are combined and welded to each other, and thus, may be deformed by heat generated during welding. However, detailed descriptions thereof will be provided later.

The casing 200 may be formed in a shape corresponding to the shape in which the substrate protecting body 500 is combined to the cartridge assembly 100. For example, when the shape in which the substrate protecting body 500 is combined to the cartridge assembly 100 is a hexahedral shape, the casing 200 may be arranged in the hexahedral shape corresponding thereto.

An opening 250 for receiving the cartridge assembly 100 may be formed in the casing 200. In FIG. 1, the opening 250 may be formed on a bottom side of the casing 200, and the casing 200 is arranged so as to receive and surround the cartridge assembly 100 from a top side of the cartridge assembly 100, but the present embodiment is limited thereto. The opening 250 may be formed on the top side of the casing 200, and the casing 200 is arranged so as to receive and surround the cartridge assembly 100 from the bottom side of the cartridge assembly 100.

In the casing 200, a penetration unit 270 may be formed through which the connecting element 120 or the terminal element 130 described above can be exposed to the outside. In other words, the connector element 120 or the terminal element 130 may be electrically connected to an external predetermined part or member, and the penetration unit 270 may be formed in the casing 200 so that the electrical connection is not disturbed by the casing 200. In addition, referring to FIGS. 1 and 2, the connector element 120 or the terminal element 130 may be exposed to the outside of the casing 200 via the penetration unit 270 formed in the casing 200. The penetration unit 270 may be formed by cutting at least one surface of the casing 200. Here, the penetration unit 270 may not necessarily need to be cut so that the connecting element 120 or the terminal element 130 is exposed to the outside, and may be formed by a small hole through which wires or the like can go as long as the connecting element 120 or the terminal element 130 is electrically connected to an external component.

Referring to FIGS. 1 and 2, the cover 300 may be combined to the casing 200, particularly, to the opening unit 250 of the casing 200. In other words, the cartridge assembly 100 may be received in a space formed by a combination of the casing 200 and the cover 300, and thus, may be protected from the external vibration or impact.

The cover 300 may be combined to the casing 200 by various methods such as welding, bolts, and pins, and may be preferably combined to the hook member 400 as described below.

When the opening 250 is formed on the bottom side of the casing 200 as illustrated in FIG. 1, the cover 300 may be combined to the opening 250 of the casing 200 on the bottom side of the casing 200. In this case, the cover 300 may protect the bottom side of the cartridge assembly 100. However, a combination location of the cover 300 is not limited thereto. When the opening 250 is formed on the top side of the casing 200 (not illustrated), the cover 300 may be combined to the opening 250 of the casing 200 on the top side of the casing 200. In this case, the cover 300 may protect the top side of the cartridge assembly 100.

Referring to FIG. 1, the substrate protecting body 500 may be combined to the cartridge assembly 100 and protect various substrates inside the battery module 10. In addition, the substrate protecting body 500 may be manufactured of a plastic material by an injection molding. The substrate may be a plate including various electric circuits and may include a bus bar configured to transmit electric energy. In other words, the substrate protecting body 500 may protect the substrate and the bus bar arranged on the substrate.

Referring to FIGS. 1 and 2, the casing 200 and the cover 300 may include a hook member 400 so as to be selectively combined to each other and uncombined from each other. The casing 200 and the cover 300 may be combined by bolting or welding. However, when the casing 200 and the cover 300 are combined by bolting, there may be a problem of wasting more than necessary space due to a need for a work space for inserting bolts. When the casing 200 and the cover 300 are combined by welding, there may be a difficult problem of separating the casing 200 and the cover 300 due to an abnormal phenomenon such as a cell swelling that can occur inside the battery module 10. However, when the casing 200 and the cover 300 are combined by using the hook member 400, a combination operation may be easy, there may be no wasted space because a working space like the case of bolting is not needed, and there may be an effect of easy separation and operation in a case when the abnormal phenomenon occurs inside the battery module 10. However, in the embodiment of the present disclosure, it is not excluded that the casing 200 and the cover 300 may be combined by bolting or welding. When necessary, the casing 200 and the cover 300 may be combined by various methods including bolting and welding.

The hook member 400 may include a hook protrusion 410 and a fastening hole 420 to which the hook protrusion 410 is fastened. Referring to FIG. 1, one or more hook protrusions 410 may be arranged on the casing 200 and the fastening holes 420 may be arranged in the cover 300 so as to correspond to the number and position of the hook protrusions 410.

Although not illustrated in the drawing, one or more hook protrusions 410 may be arranged on the cover 300 and the fastening holes 420 may be arranged in the casing 200 so as to correspond to the number and positions of the hook protrusions 410.

Figure 3:
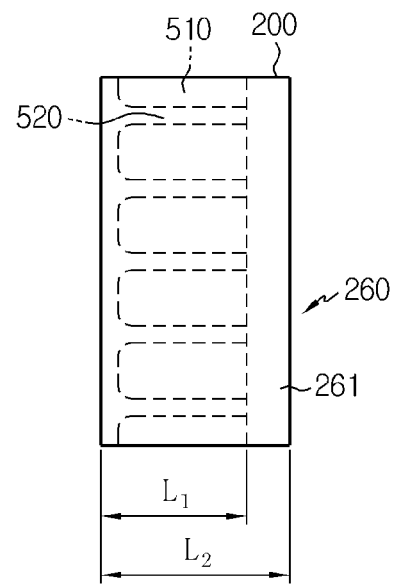
FIG. 3 illustrates a welded part in a battery module according to an embodiment of the present disclosure.
Figure 4:
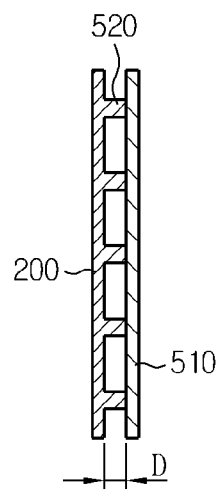
FIG. 4 is a side cross-sectional view of a main body of a substrate protecting body separated from a casing in a battery module according to an embodiment of the present disclosure.

FIG. 3 illustrates a welded part 261 in the battery module 10 according to an embodiment of the present disclosure, and FIG. 4 is a side cross-sectional view of a main body 510 of the substrate protecting body 500 separated from the casing 200 in the battery module 10 according to an embodiment of the present disclosure.

Referring to FIGS. 1, 3, and 4, an interval retaining unit 520 may be prepared so that the main body 510 of the substrate protecting body 500, which covers and protects the substrate, is separated from the casing 200 at a predetermined interval D (refer to FIG. 4). As described above, the casing 200 may be prepared, for example, by manufacturing the plates of metal material in a separate form and combining the plates of metal material to each other by welding, particularly, by the laser welding or the like, and the substrate protecting body 500 may be manufactured by preparing and injection-molding the plastic material. In addition, the casing 200 may receive and surround the substrate protecting body 500 so as to protect the substrate protecting body 500. When the casing 200 surrounds the substrate protecting body 500, the casing 200 and the main body 510 of the substrate protecting body 500 may be arranged closely to each other, and in the case where, for example, a plurality of plates of metal material prepared as a separate form are combined to each other by the laser welding, the substrate protecting body 500 of the plastic material may be thermally deformed or damaged by heat energy generated by the laser welding. In order to prevent this, the main body 510 of the substrate protecting body 500 and the casing 200 may be arranged so as to be spaced apart from each other at a certain interval (that is, D) by the interval retaining unit 520. Here, the certain interval (that is, D) between the main body 510 of the substrate protecting body 500 and the casing 200 may denote an interval (that is, D) to an extent that the main body 510 of the substrate protecting body 500 can be prevented from thermal deformation caused by heat generated by various welding methods including the laser welding. In addition, the interval retaining unit 520 may include protrusions protruding from the main body 510 of the substrate protecting unit 500, and the protrusions may protrude from the main body 510 and contact the casing 200. When the protrusions protruded from the main body 510 contact the casing, the casing 200 may not directly contact the main body 510, and thus, the interval (that is, D) may be formed between the main body 510 of the substrate protecting body 500 and the casing 200. The number and distance between the intervals (that is, D) of the protrusions may be determined in consideration of lengths, sizes, and areas of the main body 510 of the substrate protecting body 500. In addition, one or more protrusions may be prepared and when a plurality of protrusions are prepared, the distance between the plurality of protrusions may be constant or different from each other.

When the interval retaining unit 520 is formed in a longitudinal direction, a length L1 of the interval retaining unit 520 may be configured to be less than a length L2 of the casing 200, correspondingly (refer to FIG. 3). In other words, a non-contacting unit 260 which is not in contact with the interval retaining unit 520 may be prepared in the casing 200, and in this manner, the non-contacting unit 260 may be spaced from the main body 510 at the predetermined interval D. In addition, the welded part 261 where welding is performed may be formed in the non-contacting unit 260, and for example, the laser welding may be performed via the non-contacting unit 260. If the length L1 of the interval retaining unit 520 is set to be equal to the length L2 of the casing 200, and when the casing 200 is welded, the interval retaining unit 520 may be thermally deformed. In other words, since the main body 510 of the substrate protecting body 500 is spaced from the casing 200, thermal deformation may not occur during welding. However, since the interval retaining unit 520 is in direct contact with the casing 200, deformation during welding may occur. In order to prevent this, the length L1 of the interval retaining unit 520 may be prepared to be less than the length L2 of the casing 200, the non-contacting unit 260 which does not contact the interval retaining unit 520 may be prepared in the casing 200, and for example, the laser welding may be performed via the non-contacting unit 260 in which the casing 200 and the interval retaining unit 520 do not contact each other. Accordingly, there may also be an effect of preventing thermal deformation of the interval retaining unit 520.

Hereinafter, an operation of the battery module 10 according to the embodiment of the present disclosure will be described.

Referring to the partially enlarged view in FIG. 1, the interval retaining unit 520 may include protrusions protruding from the main body 510 of the substrate protecting body 500. The interval retaining unit 520 may be formed in a plurality. Referring to FIGS. 3 and 4, the interval retaining unit 520 may contact the casing 200. In addition, the non-contacting unit 260 which does not contact the interval retaining unit 520 may be provided in the casing 200, and for example, the laser welding may be performed via the welded part 261 of the non-contacting unit 260.

Since the predetermined interval D is retained between the main body 510 of the substrate protecting body 500 and the casing 200 by the interval retaining unit 520, even if the casing 200 is welded, the main body 510 of the substrate protecting body 500 may be prevented from being thermally deformed by heat generated during welding. Since welding is performed via the non-contacting unit 260 of the casing 200 with which the interval retaining unit 520 is not in contact, thermal deformation of the interval retaining unit 520 may also be prevented.

A battery pack (not illustrated) according to an embodiment of the present disclosure may include one or more battery modules 10 according to an embodiment of the present disclosure as described above. In addition, the battery pack (not illustrated) may include a case for receiving the battery module 10, in addition to such battery module 10 and further include various devices such as the BMS, a current sensor, and a fuse for controlling the charging and discharging of the battery module 10.

A vehicle (not illustrated) according to an embodiment of the present disclosure may include a battery module 10 or a battery pack (not illustrated) described above, and the battery pack (not illustrated) may include the battery module 10. In addition, the battery module 10 according to an embodiment of the present disclosure may be applied to a certain vehicle (not illustrated), which is prepared to use electricity, such as the vehicle (not illustrated), for example, an electric vehicle or a hybrid vehicle.

While the present disclosure has been particularly shown and described with reference to exemplary embodiments thereof, it is to be understood that the disclosure is not to be limited to the details thereof and that various changes and modifications may be made therein by one of ordinary skill in the art without departing from the concept and scope of the disclosure as defined by the appended claims.

INDUSTRIAL APPLICABILITY

The present disclosure relates to a battery module and a battery pack including the battery module, and more particularly, may be used for an industry related to a secondary battery.

What is claimed is:

1. A battery module comprising:
   a cartridge assembly including a plurality of cartridges receiving battery cells;
   a substrate protecting body combined to the cartridge assembly;
   a casing receiving the cartridge assembly and the substrate protecting body and surrounding the cartridge assembly and the substrate protecting body; and
   a cover combined to the casing,
   wherein the substrate protecting body includes an interval retaining unit so that a main body of the substrate protecting body is separated from the casing at a predetermined interval.

2. The battery module of claim 1, wherein the interval retaining unit comprises at least one protrusion protruding from the main body and contacting the casing.

3. The battery module of claim 2, wherein the casing comprises a non-contacting unit which does not contact the interval retaining unit, and the non-contacting unit is spaced apart from the main body at the predetermined interval.

4. The battery module of claim 3, wherein the non-contacting unit comprises a welded part where welding is performed.

5. The battery module of claim 1, wherein the casing comprises:
   a first casing surrounding the cartridge assembly; and
   a second casing combined to the first casing and surrounding the substrate protecting body.

6. The battery module of claim 5, wherein the first casing and the second casing are prepared in a separate form and combined to each other.

7. The battery module of claim 6, wherein the first casing and the second casing are combined to each other by a laser welding.

8. The battery module of claim 1, wherein the substrate protecting body is formed of a plastic material.

9. A battery pack comprising the battery module according to claim 1.

10. An automobile comprising the battery module according to claim 1.

* * * * *